United States Patent [19]

Raley, Jr. et al.

[11] 4,399,235

[45] Aug. 16, 1983

[54] HIGH DENSITY ION EXCHANGE RESINS

[75] Inventors: Charles F. Raley, Jr.; Edward R. Husser, both of Midland, Mich.

[73] Assignee: The Dow Chemical Company, Midland, Mich.

[21] Appl. No.: 262,670

[22] Filed: May 11, 1981

[51] Int. Cl.³ .................... B01J 39/08; B01J 41/08; C08L 23/28
[52] U.S. Cl. .................................... 521/31; 525/355
[58] Field of Search ........................................ 521/31

[56] References Cited

U.S. PATENT DOCUMENTS 4,280,003  7/1981  Herbin et al. ................... 521/31

FOREIGN PATENT DOCUMENTS 2218126  10/1973  Fed. Rep. of Germany.
54-163993  5/1979  Japan.
7651653  8/1976  South Africa.
7672163  12/1976  South Africa.
1393594  5/1975  United Kingdom.
2013212  1/1978  United Kingdom.

*Primary Examiner*—Joseph L. Schofer
*Assistant Examiner*—Peter F. Kulkosky

[57] ABSTRACT

High density, ion exchange resins having excellent integrity are prepared from cross-linked, aromatic polymers which have been halogenated in the presence of an organic liquid having a sufficiently high dielectric constant to prevent substantial halogenation of the polymer backbone such as various organic nucleophiles having a free electron pair associated with a nonhalogen atom, e.g., ethanol or dimethylformamide. For example, a cross-linked polystyrene which has been brominated in methylene chloride containing a small amount of ethanol can subsequently be chloromethylated and aminated to form a high density anion exchange resin useful in removing anions from thick slurries such as those employed in uranium recovery.

33 Claims, No Drawings

HIGH DENSITY ION EXCHANGE RESINS

BACKGROUND OF THE INVENTION

This invention relates to high density ion exchange resins, particularly to a method for preparing high density ion exchange resins from a cross-linked, aromatic polymer.

Ion exchange resins are normally solid materials which have the ability to exchange or absorb ions in a liquid without the resin exhibiting substantial structural alteration. For this reason, the resins, conventionally in the form of spheroidal beads, are widely employed in a variety of continuous ion exchange operations such as waste treatment, e.g., the continuous removal of undesirable components from water, and recovery processes such as the recovery of uranium. In such continuous operations, particularly up-flow or fluidized bed operations, to effectively remove the ionic ingredients from solution, the ion exchange resin advantageously possesses a density or other property sufficient to prevent entrainment losses and to provide intimate and constant contact between the resin and the ion containing liquid which is often a thick pulp or slurry.

Conventionally, many ion exchange resins are prepared by the suspension polymerization of a monovinylidene aromatic, such as styrene, with a polyvinylidene aromatic such as divinylbenzene, followed by the attachment of ion-active exchange groups to the resulting cross-linked aromatic polymer. For example, anion exchange resins are conventionally prepared by halomethylating and subsequently aminating the polymer. See, for example, Ion Exchange by F. Helfferich, published in 1962 by McGraw-Hill Book Company, New York. Unfortunately, in many ion exchange operations, particularly operations such as uranium recovery wherein the ion containing liquid is a thick slurry, conventionally prepared ion exchange resins have a sufficiently low density that the resins tend to float in the ion containing liquid, thereby limiting their effectiveness.

Various methods have been proposed for increasing the density of an ion exchange resin. For example, U.S. Pat. Nos. 2,769,788 and 2,809,942 disclose the incorporation of an inert, finely divided, solid material having a high density, i.e., 2.5 g/cc or higher, into a copolymer bead of monovinylidene and polyvinylidene aromatics. Unfortunately, such beads exhibit surface irregularities, excessive spalling and low mechanical stability, thereby tending to break when employed in a continuous operation.

Alternatively, German Pat. No. 2,218,126 proposes preparing a high density ion exchange resin using a nonionic substituted styrene, e.g., monochlorostyrene. Unfortunately, nonionic substituted styrenes are generally relatively expensive and of limited availability.

Recently, as described in Belgian Pat. No. 858,142, an anion exchange resin having increased density was prepared from a chloromethylated, cross-linked copolymer of styrene which has been halogenated in the presence of a Friedel-Crafts catalyst. However, the anion exchange resin prepared by such method generally exhibits excessive cracking or breaking and reduced water holding capacity. In addition, the separation of the catalyst from the halogenated copolymer and subsequent disposal of the resulting wash liquor in an environmentally acceptable manner is not readily accomplished.

In view of the stated deficiencies in the prior art methods for preparing ion exchange resins having higher densities, it would be highly desirable to provide an improved method for preparing such resins.

SUMMARY OF THE INVENTION

Accordingly, in one aspect, the present invention is a method for preparing a high density ion exchange resin. The method comprises contacting a cross-linked polymer of a monovinylidene aromatic with a halogenating agent in the presence of an organic liquid compound having a dielectric constant sufficiently high to prevent substantial halogenation of the polymeric backbone. Said contact is conducted at conditions sufficient to halogenate the polymer and using amounts of the halogenating agent sufficient to increase the density of the polymer. In one embodiment, the halogenation is conducted in a bulk reaction diluent of an organic liquid compound having a dielectric constant from about 8 to 11. In a second and more preferred embodiment, the halogenation of the cross-linked polymer is conducted in the presence of an organic nucleophile having a free pair of electrons associated with a nonhalogen atom. Subsequent to the halogenation, ion-active exchange groups are subsequently attached to the cross-linked polymer.

By the method of the present invention, the halogenation of the cross-linked aromatic polymer is conducted in the absence of a Friedel-Crafts catalyst or other polar catalyst, thereby eliminating the problems associated with the use of such catalysts. Surprisingly, an ion exchange resin having increased density can be prepared from the halogenated polymer without the coincident and expected loss in the resin's integrity, e.g., when prepared in spheroidal bead form less than about 10 volume percent of the resin beads are broken. Moreover, the resulting ion exchange resins are resistant to osmotic shock and possess excellent mechanical stability, crush strength and ion exchange capabilities.

As such, the high density ion exchange resins prepared by the method of this invention are effectively employed in a variety of ion exchange operations including the removal of electrolytes from water and other liquids such as in desalting, demineralizing and other purification processes. The dense anion exchange resin beads of this invention are particularly effective in the removal of uranium from solution.

DETAILED DESCRIPTION OF THE PREFERRED EMBODIMENT

In general, the cross-linked polymer of a monovinylidene aromatic employed in the preparation of the high density, ion exchange resin of the present invention is the normally solid, addition copolymerization product of a monovinylidene aromatic and a cross-linking agent copolymerizable therewith; typically, a polyethylenically unsaturated monomer.

Kinds of polymerizable monovinylidene aromatics, cross-linking agents, catalysts, polymerization media and methods for preparing the cross-linked addition copolymers as granules or as spheroidal beads of either a gel or macroporous (macroreticular) form, are well known in the art and reference is made thereto for the purposes of this invention. Illustrative of such are U.S. Pat. Nos. 2,960,480; 2,788,331; 2,642,417; 2,614,099 and 2,591,573 for preparation of the cross-linked addition copolymers in gel form and U.S. Pat. Nos. 3,637,535; 3,549,562 and 3,173,892 for the preparation of more porous cross-linked copolymers, i.e., the so-called macroporous materials, all of which are hereby incorporated by reference.

Of the polymerizable monovinylidene aromatics useful in the preparation of the cross-linked addition copolymers, styrene is generally preferred in the practice of this invention. Although monoalkyl substituted styrenes such as vinyltoluene and ethyl vinylbenzene may also be employed, especially if the substituent groups are not in a para position with respect to each other, said monoalkyl substituted styrenes are most advantageously employed in combination with styrene.

Preferred cross-linking agents include the polyvinylidene aromatics such as divinylbenzene, divinyltoluene divinyl sulfone and trivinylbenzene, and the like. Of such cross-linking agents, divinylbenzene is most preferred herein.

Advantageously, the cross-linked aromatic polymers are prepared as spheroidal beads, preferably with an average diameter from about 0.04 to about 1.3 mm, with an average diameter between about 0.3 and about 1.2 being more preferred.

The halogenating agents useful herein are those compounds which are capable of generating an ion of chlorine, bromine or iodine at the reaction conditions herein specified. Although halogen containing compounds capable of generating a suitable halogen ion such as a suitable halogen containing solid or liquid including N-bromoacetamide and N-bromosuccinimide can be employed herein; the gases or liquids of said halogens and the gases or liquids of mixed halogens such as bromine chloride and iodine chloride are preferred. More preferably, bromine or bromine chloride is employed as the halogenating agent. In general, bromine is the most preferred halogenating agent.

In the practice of this invention, the halogenating agent is employed in an amount sufficient to increase the density of the cross-linked aromatic polymer. By "increase the density of the aromatic polymer" it is meant that the density is increased by an amount measurable using conventional test methods, e.g., ASTM D-792-60T. Preferably, the density is increased at least about 10 percent, more preferably at least about 20 percent, when compared to the density of the polymer prior to its halogenation. By way of example, a cross-linked aromatic polymer having a density of 1.0 g/ml exhibits a 10 percent increase in density when the density of the polymer following halogenation is 1.1 g/ml.

Typically, the amount of halogenating agent employed to give the desired density increase will vary depending on a variety of factors including the specific cross-linked, aromatic polymer; halogenating agent and reaction conditions, employed. In general, the amount of halogenating agent required to give the desired density increase will vary from about 0.2 to about 3 moles, preferably from about 0.5 to about 2 moles, of the halogenating agent per mole of the mono- and polyvinylidene aromatic employed in preparing the cross-linked, aromatic polymer. Most preferably, the halogenating agent is employed in a ratio of from about 1 to about 1.5 moles of halogenating agent for each mole of the mono- and polyvinylidene aromatic.

To conduct the halogenation of the cross-linked polymer of the monovinylidene aromatic, the cross-linked aromatic polymer and halogenating agent are contacted in the presence of an organic liquid compound having a dielectric constant sufficiently high to prevent substantial halogenation of the polymeric backbone. In a preferred embodiment, the halogenation is conducted in the presence of an organic nucleophile having (a) a free electron pair, i.e., the organic nucleophile is capable of donating electrons associated with a nonhalogen atom and (b) a sufficiently high dielectric constant. The free electron pair is advantageously associated with an oxygen atom such as the oxygen of a hydroxy (—OH) group; a nitrogen atom such as the nitrogen atom of an amide group, e.g., carboxamide (—CONR$_2$ wherein R is H, hydrocarbyl or inertly substituted hydrocarbyl), a phosphoramide group or a nitro group (—NO$_2$) or a sulfur atom such as the sulfur atom of a sulfonyl group, sulfoxide group or the like. Preferably, such materials are normally liquid compounds, i.e., liquid at 20° C. and 760 mm Hg, and exhibit a dielectric constant of at least 11. For the purpose of this invention, dielectric constant is expressed as the dielectric constant of the material at 20° C. as measured using conventional techniques. Preferably, the organic nucleophile has a dielectric constant of at least about 13, more preferably at least about 14, most preferably at least about 15.

In general, organic nucleophiles having such dielectric constants will promote the halogenation of the aromatic ring relative to the halogenation of the side chain thereby preventing substantial amounts of halogenation of the polymeric backbone. Stated alternatively, a greater percentage of the halogen which bonds to the aromatic compound will become bonded to the aromatic ring when halogenation is conducted in the presence of the organic nucleophile than when the halogenation is conducted employing the same conditions except no organic nucleophile is employed. Generally, upon the halogenation of a cross-linked, aromatic polymer in the absence of the organic nucleophile or a polar catalyst, various and often significant amounts of the halogen become chemically bonded to the polymer backbone. For example, as much as 80 percent of the halogen bonded to the polymer is bonded to the polymer backbone using a reaction diluent such as carbon tetrachloride whereas up to about 40 percent of the halogen is bonded to the side chain using a chloroform reaction diluent. Unfortunately, the ion exchange resins subsequently prepared from the polymer having such high amounts of halogen chemically bonded to the polymer backbone often exhibit a substantial loss in integrity and reduction in water-holding capacity. Advantageously, in the presence of the organic nucleophile at least 90, preferably at least about 95, more preferably at least about 97, weight percent of the halogen which becomes chemically bonded to the cross-linked aromatic polymer is bonded to the aromatic ring, wherein the percent ring halogenation is determined using conventional techniques such as exemplified by Example 1, particularly Note 3 of Table I. Most preferably, at least about 99 percent of the halogen becomes chemically bonded to the aromatic ring.

In addition, when conducted in the presence of an organic nucleophile, the completion (degree of conversion) of the halogenation reaction, i.e., the total amount of the halogen chemically bonded to the aromatic polymer (both to the polymer backbone and aromatic ring), is generally greater than when the halogenation is conducted using identical techniques except no organic nucleophile is employed. In the practice of this invention, the degree of conversion can be varied over wide ranges, e.g., the halogenated polymer may comprise a number average of less than 0.1 or more than 1 halogen atom per aromatic ring contained by the polymer. The desired degree of conversion is typically dependent on the desired density of the halogenated polymer and the ion exchange resins prepared therefrom. In most applications, the halogenated polymer will contain a number average of at least about 0.55, advantageously at least about 0.6, preferably at least about 0.7, halogen atoms per aromatic ring in the polymer wherein the number average halogen atoms is determined by a method such as disclosed in Table I, particularly Footnote 4 of Table I. When subsequently employed in the preparation of an ion exchange resin useful in processes involving a dense ion containing slurry, such as uranium recovery, the halogenated polymer advantageously contains a number average of at least about 0.85, preferably at least about 0.9 halogen atom per aromatic ring in the polymer.

Advantageously, the organic nucleophiles useful herein are soluble in or miscible with any reaction diluent employed. In addition, the nucleophile is advantageously an essentially neutral material, i.e., exhibits essentially no acidic or basic characteristics such as not being highly ionized or dissociated in water at room temperatures. In general, the essentially neutral nucleophiles exhibit a pKa and pKb (wherein pKa is the negative log of the ionization or dissociation constant of an acid and pKb is the negative log of the ionization or dissociation constant of a base) of equal to or greater than about 7. Preferably, the pKa and pKb of the material is greater than about 9, more preferably, greater than about 10.

Representative of the organic nucleophiles useful herein are the aliphatic alcohols, particularly the aliphatic alcohols having from about 1 to about 10 carbon atoms including ethanol, methanol, isopropanol, n-butanol, isobutanol, cyclohexanol and 2-ethylhexanol; monohydric glycol ethers such as ethylene glycol methyl ether, diethylene glycol n-butyl ether and diethylene glycol ethyl ether; polyhydroxy containing compounds including glycols such as ethylene or propylene glycol; and polyoxyalkylene polyols including the glycol ethers such as the condensation polymers of an alkylene glycol such as polyethylene glycol, preferably having a number average molecule weight from about 100 to about 400 or an adduct of an alkylene oxide or halogenated alkylene oxide with water, amine, sucrose, glycerol or similar initiator; sulfonyl containing organics such as tetramethylene sulfone; phosphoramides such as hexamethyl phosphoramide; carboxamides such as the dialkyl carboxamides, e.g., dimethylformamide; nitro-substituted hydrocarbons such as nitromethane, nitroethane and nitropropane; sulfoxides such as the dialkyl sulfoxides, e.g., dimethylsulfoxide; dioxane; nitriles such as acetonitrile and the like. Preferred of such organic nucleophiles are the alkyl alcohols, dialkyl carboxamides and dialkyl sulfoxides; with the alkyl alcohols and dialkyl carboxamides, particularly ethanol and dimethylformamide, being most preferred.

The organic nucleophile is employed in an amount which provides the desired increases in ring halogenation and degree of conversion. In the normal and preferred practice of the present invention, the halogenation is conducted in a reaction diluent comprising a mixture of the organic nucleophile and an organic liquid, (hereinafter referred to as an "organic liquid diluent"), different from the organic nucleophile, which is capable of swelling the aromatic polymer and which advantageously forms a solution with the organic nucleophile. In such case, the organic nucleophile is employed in amounts varying from about 0.1 to about 10, preferably from about 1 to about 5, more preferably from about 2 to about 3, volume parts per 100 volume parts of the organic liquid diluent. Alternatively and less preferably, no organic liquid diluent is employed, i.e., the halogenation reaction is essentially conducted neat, and the organic nucleophile is advantageously employed in an amount from about 0.01 to about 0.8 mole of the organic nucleophile per mole of the halogenating agent.

In general, the organic liquid diluents advantageously employed in the preferred practice of this invention are organic liquids which are less reactive towards a halogen ion than the aromatic polymer and which are capable of swelling the cross-linked polymer, preferably to a degree sufficient to allow the halogenation of the entire aromatic polymer structure. In general, the organic liquid diluent typically exhibits a dielectric constant of less than 11, preferably from 1 to 10, and will dissolve a homopolymer of the monovinylidene aromatic employed in preparing the cross-linked, aromatic polymer. Typically, such liquids have a solubility parameter less than 10, preferably from about 7 to 10 $(cal/cc)^{\frac{1}{2}}$. Representative of organic liquid diluents include the halogenated, saturated aliphatic hydrocarbons, particularly halogenated alkanes having from 1 to about 4 carbon atoms such as methylene chloride, 1,2-dichloroethane, 1,1-dichloroethane, chloroform, carbon tetrachloride, trichloroethane; halogenated, aromatic hydrocarbons such as chlorobenzene and the like. Preferred are methylene chloride, 1,2-dichloroethane and chloroform.

The amount of the organic liquid diluent can vary from that amount required to swell the polymer sufficiently for the halogenation reaction to take place relatively homogeneously throughout the polymer structure to many times such minimum amount. In general, the amount of the reaction diluent most advantageously employed will vary depending on the specific cross-linked, aromatic polymer, the organic nucleophile and the halogenating agent employed. In general, the organic liquid diluent is employed in amounts from about 0.5 to about 10, preferably from about 1 to about 5, volume parts per volume parts of the unswollen, cross-linked, aromatic polymer.

In a second embodiment of the present invention, halogenation of the cross-linked aromatic polymer is conducted by contacting the polymer with a halogenating agent in a bulk reaction diluent of an organic liquid compound having a dielectric constant from about 8 to 11. In said embodiment, the organic liquid compound employed as the bulk reaction diluent contains neither a polar catalyst nor an organic nucleophile. Preferred organic liquids having such dielectric constants are 1,2-dichloroethane and methylene chloride. As noted previously, in the preferred embodiment of this invention, organic liquids having a dielectric constant from 8 to 11 can also be employed as the organic liquid diluent in combination with the hereinbefore described organic nucleophiles. Although lesser amounts of the polymeric backbone are generally halogenated when an organic nucleophile is employed in combination with the organic liquids exhibiting a dielectric constant from about 8 to 11, acceptable density increases without substantial amounts of backbone halogenation can be obtained using such organic liquid as the bulk reaction diluent, i.e., the liquid does not contain a polar catalyst or an organic nucleophile. In said embodiment, halogenation is preferably conducted such that at least about 90, more preferably at least about 97, most preferably at least about 98, percent of the halogen which becomes chemically bonded to the polymer is bonded to the aromatic ring.

In conducting the halogenation, although the order of addition of the reactants is not critical, the cross-linked, aromatic polymer is advantageously swollen by the bulk reaction diluent or the organic liquid diluent, which organic liquid diluent will generally contain the organic nucleophile, and halogenation conducted while the polymer is in this swollen state. For example, the polymer can advantageously be dispersed and swollen in the bulk reaction diluent or the mixture of organic liquid diluent and organic nucleophile; then the halogenating agent added to the resulting mixture. During the addition of the halogenating agent, the reactant mixture is maintained at temperatures sufficient to halogenate the polymer and agitated sufficiently to maintain an essentially uniform mixture of the reactants. The addition of the halogenating agent to the mixture may be continuous, batchwise or incremental, i.e., added as shots in two or more increments, with incremental or continuous addition being preferred. Using this method, once the cross-linked aromatic polymer is swollen, excess amounts of the bulk reaction or the mixture of the organic liquid diluent and organic nucleophile, i.e., those amounts of the bulk reaction diluent or said mixture not imbibed by the cross-linked polymer, are advantageously removed by conventional separation, e.g., filtration, techniques and the swollen beads subsequently halogenated.

Alternatively, the cross-linked aromatic polymer can be swollen in a mixture of the bulk reaction diluent (or a solution of the organic liquid diluent and organic nucleophile) and halogenated agent. Halogenation is then allowed to proceed without the subsequent addition of more halogenating agent. Using said method, to facilitate contact of the entire polymer structure with the halogenated agent, the polymer is advantageously dispersed in an organic liquid which is resistant to halogenation and does not significantly swell the polymer such as an alkane having from 6 to about 10 carbon atoms, e.g., hexane or 1,1,2-trichloro-1,2,2-trifluoroethane. The mixture of the bulk reaction diluent (or a solution of the organic liquid diluent and organic nucleophile) and halogenating agent is subsequently added, usually over a period of time, to the resulting dispersion and halogenation conducted.

The halogenation reaction is conducted at temperatures sufficient to halogenate the polymer. In general, halogenation is advantageously conducted at temperatures from about 0° to about 60° C., with temperatures from about 10° to about 40° C. being preferred. While reaction pressure is not critical, pressures between about 0 to about 15 psig are advantageously employed.

At the specified temperatures, halogenation generally requires a reaction time from about 30 minutes to about 8 hours. Preferably, reaction times from about 60 minutes to about 4 hours, more preferably from about 2 hours to about 3 hours, are employed. Said reaction times include any time required for the addition of the halogenating agent to the reaction mixture.

Following halogenation, the reactants are adjusted to ambient temperatures, any excess halogen, i.e., unreacted halogenating agent, removed, and the resulting high density halogenated polymer recovered in a purified form. Advantageously, the halogenated polymer is isolated by conventional separation, e.g., filtration techniques. The isolated product is purified by solvent extraction or by neutralization with an aqueous or alcoholic solution and subsequent washing with water or a volatile organic liquid such as acetone, methanol, methylene chloride, tetrahydrofuran, 1,2-dichloroethane or the like to remove residual organic nucleophile, halogenating agent or the like.

The high density halogenated polymer may then be converted to a high density ion exchange resin or high density chelating resin using techniques well known in the art for converting conventional cross-linked, monovinylidene aromatic polymers to such resins.

In general, in the preparation of anion exchange resins, the halogenated polymer is advantageously haloalkylated, preferably halomethylated, more preferably chloromethylated and ion exchange groups subsequently attached to the haloalkylated polymer. Methods for haloalkylating the cross-linked aromatic polymers and the haloalkylating agents employed in such methods are also well known in the art and reference is made thereto for the purposes of this invention. Illustrative of such are U.S. Pat. Nos. 2,642,417; 2,960,480; 2,597,492; 2,597,493; 3,311,602 and 2,616,877 and Ion Exchange, by F. Helfferich, published in 1962 by McGraw-Hill Book Company, New York, all of which are hereby incorporated by reference. Typically, the haloalkylating reaction consists of swelling the cross-linked, aromatic polymer with a haloalkylating agent, preferably bromomethyl methyl ether, chloromethyl methyl ether or a mixture of formaldehyde and hydrochloric acid, particularly chloromethyl methyl ether, and then reacting the polymer and haloalkylating agent in the presence of a Friedel-Crafts catalyt such as $ZnCl_2$, $FeCl_3$ and $AlCl_3$.

Generally, an anion exchange resin is prepared from the resulting haloalkylated polymer by contacting the polymer with a compound reactive with the halogen of the haloalkyl group and which, upon reaction, forms an active anion exchange group. Such compounds (i.e., aminating agents) and methods for preparing anion exchange resins therefrom, i.e., weak base resins and strong base resins, are well known in the art and U.S. Pat. Nos. 2,632,000; 2,616,877; 2,642,417; 2,632,001; 2,992,544 and Ion Exchange by F. Helfferich, published in 1962 by McGraw-Hill Book Company, New York (all of which are hereby incorporated by reference) are illlustrative thereof. Typically, a weak base resin is prepared by contacting the haloalkylated copolymer with ammonia, a primary amine or a secondary amine. Representative primary and secondary amines include methylamine, ethylamine, butylamine, cyclohexylamine, dimethylamine, diethylamine and the like. Strong base ion exchange resins are prepared using tertiary amines such as trimethylamine, triethylamine, tributylamine, dimethylisopropanolamine, dimethylethanolamine, ethyl methylpropylamine or the like as the aminating agent.

Amination generally comprises heating, with reflux, a mixture of the polymer and at least a stoichiometric amount of the aminating agent, i.e., ammonia or the amine, to a temperature sufficient to react the aminating agent with the halogen atom attached to the carbon atom alpha to the aromatic nucleus of the polymer. A swelling agent for the haloalkylated polymer such as water, ethanol, methanol, methylene chloride, ethylene dichloride or the like is optionally employed. Amination of the haloalkylated polymer is generally conducted at temperatures between about 25° and about 150° C. for a period ranging from about 2 to about 6 hours.

Generally, chelating resin beads are prepared from the haloalkylated polymer by attaching thereto chelate active groups, e.g., carboxyl groups. Illustrative of the well known methods for preparing chelate resins is U.S. Pat. No. 2,888,441 wherein the haloalkylated polymer is aminated by a technique hereinbefore described and the aminated copolymer subsequently reacted with a suitable carboxyl containing compound, e.g., chloroacetic acid. Alternatively, the haloalkylated polymer can be directly reacted with (1) a suitable amino acid such as iminodiacetic acid or glycine (see, for example, U.S. Pat. Nos. 2,875,162 and 3,337,480) or (2) an aminopyridine such as bis-(2-picolyl)amine and N-(2-hydroxypropyl)-2-picolylamine (see U.S. Pat. No. 4,031,038) to form a chelating resin.

Cation exchange resin beads are advantageously prepared from the halogenated polymer using techniques well known in the art for converting a cross-linked addition copolymer of a monovinylidene aromatic to a cation exchange resin. Illustrative of such methods for preparing cation exchange resins are U.S. Pat. Nos. 3,266,007; 2,500,149; 2,631,127; 2,664,801; 2,764,564 and Ion Exchange by F. Helfferich, published in 1962 by McGraw-Hill Book Company, New York (all of which are hereby incorporated by reference). Advantageously, the strong acid cation exchange resins are prepared by sulfonating the halogenated polymer. While the sulfonation may be conducted neat, generally, the bead is swollen using a suitable swelling agent such as a sulfonation resistant chlorinated hydrocarbon (e.g., chlorobenzene or tetrachloroethylene) or an aliphatic or aromatic hydrocarbon (e.g., toluene or xylene) and the swollen bead reacted with a sulfonating agent such as sulfuric or chlorosulfonic acid or sulfur trioxide. Preferably, an excess amount of the sulfonating agent, e.g., from about 2 to about 7 times the weight of the bead, is employed and the sulfonation is conducted at a temperature from about 50° to about 200° C.

The following examples are presented to illustrate the invention and should not be construed to limit its scope. All percentages and parts are by weight unless otherwise indicated.

EXAMPLE 1

To a suitable sized flask equipped with an agitator, thermometer, addition funnel, reflux condenser and heating and cooling means is added 52.3 grams (g) of spheroidal beads of a polymer of about 98 parts styrene and 2 parts divinylbenzene, 200 milliliters (ml) of methylene chloride and 7.5 ml of ethanol. The resulting mixture is mildly agitated at room temperature for about 60 minutes to allow the beads to swell in the solution of the methylene chloride and ethanol. The temperature of the flask is adjusted to 10° C. and 87.9 g of liquid bromine then added over a period of about 1 hour. The temperature of the resulting reaction mixture is maintained for an additional 2 hours at 10° C. The reaction mixture is then heated to about 40° C. for 1 hour period and then cooled to ambient temperatures. The unreacted bromine is subsequently neutralized using methyl ethyl ketone. The halogenated polymer beads are then washed several times with methylene chloride and methanol. After washing, the cream-colored beads are vacuum dried at room temperature. The beads are analyzed using conventional analytical techniques such as neutron activation analysis to determine the percent ring bromination and the degree of conversion of the halogenation reaction.

The halogenated beads are chloromethylated by placing a 76 g portion of the beads in a suitable flask containing 500 ml of chloromethyl methyl ether. This mixture is allowed to stand for 30 minutes at room temperature with agitation. At the end of this period, 25 g of ferric chloride is added to the flask and the flask is then heated to 55° C. This temperature is maintained for 3 hours, at the end of which time the flask is cooled. The chloromethylated beads are washed with excess amounts of methanol.

The chloromethylated beads are aminated by transferring them to a suitably sized flask containing a mixture of dimethoxy methane and water. An excess amount of a 25 percent aqueous solution of trimethylamine is added dropwise to the flask at 25° C. The flask is maintained at room temperature for 16 hours. The dimethoxy methane is then distilled off with the temperature of the flask being raised to 60° C. to complete distillation. Following distillation, the flask is cooled to room temperature and a sufficient amount of a 5 percent aqueous solution of hydrochloric acid is added to the flask to acidify the beads. The beads are then washed with deionized water to a pH of about 6. The washed beads are recovered by conventional filtration techniques and denoted Sample No. 2.

In a similar manner, other high density anion exchange resin beads (Sample Nos. 3 and 4) are prepared using bromine and the various organic nucleophiles specified in Table I. For purposes of comparision, an anion exchange resin is prepared in spheroidal bead form (Sample No. 1) from cross-linked, aromatic polymer beads halogenated in a similar mannr except the organic nucleophile is not included within the reaction mixture. In addition, a high density anion exchange resin (Sample No. C-1) is prepared from a cross-linked, aromatic polymer which is brominated in the presence of a Friedel-Crafts catalyst. A high density anion exchange resin (Sample No. C-2) is also prepared from a cross-linked, monovinylidene aromatic polymer prepared using bromostyrene as a partial substitute for styrene. As a control, an anion exchange resin in spheroidal bead form is prepared from a cross-linked, aromatic polymer which has not been halogenated (Sample No. C). Each sample is tested for wet volume capacity, dry weight capacity, density, water retention capacity, sphericity and osmotic shock resistance. The results of this testing are recorded in Table I.

TABLE I

| Sample No. | Reaction Diluent (1) | Organic Nucleophile (2) Type | Organic Nucleophile (2) Conc., PPH | Catalyst | % Ring Bromination (3) | % Conversion (4) | Wet Volume Capacity, Meq/ml (5) | Dry Weight Capacity, Meq/g (6) | H₂O In Beads, % (7) | Wet Density g/ml (8) | Sphericity, % (9) | Osmotic Shock Res., % (10) |
|---|---|---|---|---|---|---|---|---|---|---|---|---|
| C* | — | — | — | — | — | — | 1.25 | 4.2 | 56.5 | 1.078 | 93 | 90 |
| C-1* (11) | MeCl₂ | — | — | FeCl₃ | 99.8 | 83.3 | 0.93 | 1.92 | 28.9 | 1.20 | 72 | <25 |
| C-2* | — | — | — | — | — | 72.7 | 1.05 | 3.20 | 52.4 | 1.18 | 98 | 98 |

TABLE I-continued

| Sample No. | Reaction Diluent (1) | Organic Nucleophile (2) Type | Organic Nucleophile (2) Conc., PPH | Catalyst | % Ring Bromination (3) | % Conversion (4) | Wet Volume Capacity, Meq/ml (5) | Dry Weight Capacity, Meq/g (6) | H₂O In Beads, % (7) | Wet Density g/ml (8) | Sphericity, % (9) | Osmotic Shock Res., % (10) |
|---|---|---|---|---|---|---|---|---|---|---|---|---|
| 1 | MeCl₂ | — | — | — | 98.8 | 61.9 | 1.57 | 4.15 | 49.5 | 1.16 | 99 | 95 |
| 2 | MeCl₂ | EtOH | 3 | — | ~100 | 67.2 | 1.56 | 3.88 | 46.1 | 1.20 | 97 | >95 |
| 3 | MeCl₂ | MeOH | 3 | — | ~100 | 62.6 | 1.48 | 3.85 | 48.6 | 1.18 | 99 | >95 |
| 4 (12) | MeCl₂ | DMF | 2 | — | ~100 | 58.9 | 1.14 | 2.88 | 53.5 | 1.15 | 99 | >95 |

*Not an example of the present invention.
(1) Reaction diluents employed are given in abbreviated form wherein:
MeCl₂ = methylene chloride
Concentration is expressed as the volume parts of the organic nucleophile per 100 volume parts of the organic liquid diluent; methylene chloride in this example.
(2) The organic nucleophile is expressed in an abbreviated form wherein:
EtOH = ethanol
MeOH = methanol
DMF = dimethylformamide
(3) Percent ring bromination is the percent of the total bromine atoms chemically bonded to the cross-linked, aromatic polymer which are bonded to an aromatic nucleus. In this example, the substitution of a bromine atom on the aromatic polymer can occur in the nucleus, or in the polymer backbone. The percent ring bromination is the sum of the bromine atoms which become chemically bonded to the ring (nucleus) divided by the total number of bromine atoms chemically bonded to the aromatic polymer (i.e., both ring and backbone halogenation) multiplied by 100.
(4) Conversion relates to the number average of bromine atoms chemically bonded to each aromatic ring in the polymer structure. The conversion is calculated by dividing the total number of bromine atoms chemically bonded to the aromatic polymer by the total number of aromatic rings in the polymer. The percent conversion of Sample No. C-2 represents the mole percent bromostyrene based on the total moles of mono- and polyvinylidene aromatic employed in preparing the polymer.
(5) Determination of the available anion exchange sites per unit volume which is measured by chloride titration with silver nitrate as described in DOWEX: Ion Exchange, published in 1964 by The Dow Chemical Company, pages 37 and 38.
(6) Determination of the available anion exchange sites per unit weight (dry) which is measured by chloride titration with silver nitrate as described in DOWEX: Ion Exchange, published in 1964 by The Dow Chemical Company, pages 37 and 38.
(7) Water retention is the weight percent of water retained by the beads based on the weight of the beads and the water.
(8) Wet density of the anion exchange resin beads as determined by ASTM test method designated D-792-60T.
(9) Sphericity, i.e., those beads which are unbroken, is a measurement of the weight percent of dry beads which freely roll down an inclined tray having a smooth surface and a slope of about 1 inch per foot. In this example, sphericity was determined by air drying to a free flowing state about 25 ml of ion exchange beads. The dried beads are weighed (Wd). The dry beads are then placed on the high edge of an inclined tray having the above slope and having dimensions of about 11.5 × 11.5 inches, with sides of about 0.5 inch. The beads are allowed to roll down the tray. The spherical beads, i.e., those beads which roll freely down the tray, are collected and weighed (Wr). Sphericity is the weight percent of the beads which roll freely down the tray as calculated using the following formula:

$$\frac{Wd - Wr}{Wd} \times 100 = Wt \% \text{ sphericity}.$$

Although not employed in this Example, the inclined tray (or plane) can be vibrated. In such case, the inclined tray is advantageously sloped about 0.5 inch per foot and the high edge of the tray is vibrated about 0.25 inch vertically about twice every second.
(10) Osmotic shock is a determination of the percent (by number) of ion exchange beads which break upon the exposure thereof to a high electrolytic concentration. In said determination, a dish containing an aqueous solution of 20 percent sodium hydroxide is placed on the stage of the microscope. The microscope is set to give 10X magnification and focused so that the beads placed in the solution are clearly in view. A bead, which has been wiped to remove excess water therefrom, is dropped in the aqueous sodium hydroxide solution. The bead is examined under the microscope for any cracking or breaking. Approximately 50 beads are tested in this manner and the percent of beads which are resistant to osmotic shock calculated using the formula:

$$\frac{Nu}{Nt} \times 100$$

wherein Nu is the number of beads which exhibit no breaking or cracking and Nt is the total number of beads tested.
(11) The brominated product prepared using a conventional Friedel-Crafts catalyst (FeCl₃) exhibits significant amounts of chlorine, e.g., about 0.8 mole percent based on the moles of mono- and polyvinylidene aromatic employed in the preparation of the aromatic polymer bonded to the polymeric backbone.
(12) The reaction mixture comprises 250 ml of a combination of 80 volume parts methylene chloride and 20 volume parts 1,1,2-trichloro-1,2,2-trifluoroethane in place of the 200 ml of methylene chloride.

As noted by the data in the foregoing Table, a cross-linked aromatic polymer is effectively halogenated in a bulk reaction diluent of an organic liquid having a dielectric constant from about 8 to 11, i.e., methylene chloride, without substantial halogenation of the backbone. The anion exchange resin prepared therefrom also exhibited excellent properties. Increases in the percent ring halogenation and, in general, the percent conversion are experienced when an organic nucleophile is included in the methylene chloride. The lower percent conversion found using dimethylformamide as the organic nucleophile (Sample No. 4) is believed to be due to the fact that greater amounts of the reaction diluent are employed, thereby diluting the concentration of the halogenating agent. The polymers halogenated in the presence of an organic nucleophile also showed greaters amount of ring halogenation than an identical polymer halogenated using a conventional Friedel-Crafts catalyt. In addition, the resins prepared by the method of the present invention exhibit significantly improved sphericity, resistance to osmotic shock, and higher water holding capacities than resins prepared from a polymer brominated in the presence of a Friedel-Crafts catalyst.

EXAMPLE 2

To exemplify alternative techniques of the present invention for halogenating the cross-linked aromatic polymer, 52.3 g of spheroidal beads of a copolymer of about 98 parts styrene and about 2 parts divinylbenzene are added to a suitable size vessel equipped with an agitator, thermometer, reflux condenser, addition funnel and heating and cooling means containing about 50 ml of 1,1,2-trichloro-1,2,2-trifluoroethane. The resulting mixture is agitated and a mixture of 150 ml of methylene chloride, 7.5 ml of ethanol and 99 g of liquid bromide (1.25 moles of bromine per mole of mono- and polyvinylidene aromatic employed in the preparation of the aromatic copolymer) is added to the vessel. The resulting mixture is mildly agitated and the copolymer beads allowed to swell, thereby imbibing the methylene chloride and liquid bromine simultaneously with the result that the bromine is uniformly distributed throughout the beads to help increase the percent conversion. The temperature of the vessel is adjusted to 10° C. and maintained at this temperature for 1 hour. The reaction mixture is then cooled to ambient temperatures and the unreacted bromine neutralized using methyl ethyl ketone. The brominated beads are subsequently washed with methylene chloride and methanol and vacuum dried. Upon analysis, the beads are found to contain essentially no bromine on the polymeric backbone and the percent conversion determined to be about 71.5 percent. Upon chloromethylation and amination, the resulting anion exchange resin is found to have a density of about 1.183 and excellent dry weight and wet volume capacities, water holding capacity sphericity and osmotic shock resistance.

In a similar manner, identical copolymer beads are brominated using 1.5 equivalents of bromine per equivalent of copolymer. The resulting brominated beads, which beads have subsequently been purified, are found to have essentially no bromine bonded to the polymeric backbone and the percent conversion determined to be about 78 percent. Upon chloromethylation and amination, the wet density of the resulting anion exchange resins is about 1.20. The beads also exhibit excellent dry weight and wet volume capacities, sphericity and osmotic shock resistance.

In a similar manner, anion exchange resin beads (Sample Nos. 3–6) are prepared using the various organic nucleophiles and amounts of bromine specified in Table II. For purposes of comparison, anion exchange resin beads (Sample No. 1) are prepared in an identical manner except no organic nucleophile is employed. In addition, copolymer beads of 97 parts styrene and 3 parts divinylbenzene which beads are not brominated are chloromethylated and aminated to form an anion exchange resin (Sample No. C). The resulting anion exchange resins are evaluated to determine their capacities, wet density and sphericity. The results of this testing are set forth in Table II.

TABLE II

| Sample No. | Organic Nucleo- phile (1) | % Bromine (2) | % Ring Bromina- tion (3) | % Conver- sion (4) | Wet Density, g/ml (5) | Wet Volume Capacity, eq/ml (6) | Dry Weight Capacity, eq/g (7) | $H_2O$ in Beads, % (8) | Spher- icity, % (9) | Osmotic Shock Res., % (10) |
|---|---|---|---|---|---|---|---|---|---|---|
| C* | — | — | — | — | 1.08 | 1.25 | 4.2 | 56.5 | 93 | 90 |
| 1 | — | 1.1 | 98.8 | 53.2 | 1.16 | 1.57 | 4.15 | 49.5 | 99 | 95 |
| 2 | EtOH | 1.0 | 100 | 67.5 | 1.21 | 1.62 | 3.73 | 41.5 | 100 | >98 |
| 3 | EtOH | 1.1 | 100 | 74.5 | 1.20 | 1.54 | 3.62 | 46.5 | 100 | >98 |
| 4 | EtOH | 1.25 | 100 | 80.5 | 1.20 | 1.31 | 3.31 | 47.2 | 100 | 100 |
| 5 | EtOH | 1.5 | 100 | 92.0 | 1.20 | 1.27 | 3.33 | 50.5 | 100 | 99 |
| 6 (11) | DMF | 1.5 | 100 | 96.8 | 1.16 | 1.02 | 3.54 | 58.9 | 99 | 100 |

*Not an example of the present invention.
(1) Same as (1) in Table I.
(2) Percent bromine is expressed as the moles of bromine employed per mole of mono- and polyvinylididene aromatic employed in the preparation of the aromatic polymer.
(3) Same as (3) in Table I.
(4) Same as (4) in Table I.
(5) Same as (8) in Table I.
(6) Same as (5) in Table I.
(7) Same as (6) in Table I.
(8) Same as (7) in Table I.
(9) Same as (9) in Table I.
(10) Same as (10) in Table I.
(11) Sample No. 5 is prepared from an aromatic polymer comprising about 98 parts styrene and 2 parts divinylbenzene.

EXAMPLE 3

Using yet other techniques of the present invention to brominate the crosslinked, monovinylidene aromatic polymer, 52.3 g of a copolymer of about 97 parts styrene and 3 parts divinylbenzene is added to a mixture of 250 ml of methylene chloride and 7.5 ml of ethanol contained in a reaction vessel similar to that of Example 1. The resulting mixture is mildly agitated at ambient temperatures for about 1.5 hours to allow the beads to swell in the methylene chloride-ethanol mixture. At the end of this period, the excess liquid is filtered from the beads, leaving a stirrable mass of swollen beads containing methylene chloride and ethanol. The temperature of the flask is adjusted to about 10° C. While continuously agitating the mass of beads, 119.9 g of bromine (about 1.5 moles of bromine per mole of the mono- and polyvinylidene aromatic employed in the preparation of the aromatic copolymer) is added over about a 1.5 hour period. The temperature is maintained at about 10° C. during this addition and for an additional 1.5 hours. The reaction mixture is then heated to about 40° C. and maintained at this temperature for a 1 hour period. Following this period, the beads are cooled to ambient temperatures and the unreacted bromine neutralized using methyl ethyl ketone. The brominated beads are then washed with methylene chloride and methanol and vacuum dried. The beads are analyzed using conventional techniques to determine the percent ring bromination and percent conversion. The brominated beads are then chloromethylated and aminated using techniques similar to those of Example 1. The resulting anion exchange resin beads are designated Sample No. 2.

As evidenced by the data in Table II, using the exemplified halogenation techniques, a cross-linked aromatic polymer is effectively halogenated in a bulk reaction diluent of methylene chloride. Again, greater increases in the percent conversion and percent ring halogenation are obtained when an organic nucleophilic is employed in combination with the methylene chloride, with essentially no halogen being found to be chemically bonded to the polymeric backbone. In addition, when compared to the anion exchange resin which has not been halogenated, the densities of the resins prepared by the method of this invention are significantly increased. In addition, the anion resin beads prepared by the method of the present invention are again shown to possess excellent ion exchange capacities, sphericity and osmotic shock resistance.

EXAMPLE 4

Using the procedure of Example 3, spheroidal beads of a copolymer of 92 parts styrene and 8 parts divinylbenzene are brominated in the presence of a methylene chloride containing ethanol as the organic nucleophile. The brominated beads have an average of 0.97 bromine atom per aromatic ring contained by the polymer (i.e., 97 percent conversion) with essentially no bromine being chemically bonded to the polymeric backbone.

Following neutralization of the unreacted bromine and washing with methylene chloride and methanol, the resulting brominated beads are swollen in ethylene dichloride and sulfonated for 3 hours at 80° C. using chlorosulfonic acid. The resulting sulfonated beads possess a wet density of 1.37 g/ml, a dry weight capacity of 3.18 equivalents/milliliter, contain 42 percent water, exhibit greater than about 95 percent sphericity and are effectively employed as a cation exchange resin.

For comparative purposes, identical copolymer beads which have not been halogenated are sulfonated employing identical techniques and possess a wet density of only about 1.25 g/ml.

What is claimed is:

1. A method for preparing an ion exchange resin, said method comprising the steps of (a) contacting a cross-linked polymer of a monovinylidene aromatic with a halogenating agent in the presence of an organic liquid compound having a dielectric constant sufficiently high to prevent substantial halogenation of the polymeric backbone, said contact being conducted at conditions sufficient to halogenate the polymer and using amounts of the halogenating agent sufficient to increase the density of the polymer and (b) attaching ion-active exchange groups to the halogenated, cross-linked polymer.

2. The method of claim 1 wherein the halogenation is conducted in the absence of a polar catalyst.

3. The method of claim 1 wherein the halogenation is conducted at conditions such that at least about 98 percent of the halogen which becomes chemically bonded to the polymer is chemically bonded to an aromatic ring.

4. A method for preparing an ion exchange resin, said method comprising the steps of (a) contacting a cross-linked polymer of a monovinylidene aromatic, a halogenating agent and an organic nucleophile having a free electron pair associated with a nonhalogen atom and a dielectric constant sufficiently high to prevent substantial amounts of halogenation of the backbone, said contact being conducted at conditions sufficient to halogenate the polymer and using amounts of the halogenating agent sufficient to increase the density of the cross-linked aromatic polymer and (b) subsequently attaching ion-active exchange groups to the halogenated, cross-linked polymer.

5. The method of claim 3 wherein the organic nucleophile exhibits a dielectric constant of at least about 11.

6. The method of claim 4 wherein the halogenating agent is employed in amounts sufficient to increase the density of the cross-linked aromatic polymer by at least about 10 percent.

7. The method of claim 5 wherein the free electron pair of the organic nucleophile is associated with an oxygen, nitrogen or sulfur atom and the dielectric constant of the organic nucleophile is at least about 13.

8. The method of claim 6 wherein at least about 99 percent of the halogen atoms which become chemically bonded to the cross-linked polymer are chemically bonded to the aromatic ring and the halogenating agent and organic nucleophile are employed in amounts sufficient to increase the density of the cross-linked aromatic polymer by at least about 20 percent.

9. The method of claim 4 wherein the halogenating agent is bromine or bromine chloride and the organic nucleophile is an aliphatic alcohol, a monohydric glycol ether, a polyhydric alcohol, a sulfonyl-containing organic, a phosphoramide, a carboxamide, a sulfoxide, a nitrile or a nitro-substituted hydrocarbon.

10. The method of claim 9 wherein the organic nucleophile is an alkyl alcohol, a dialkyl carboxamide or a dialkylsulfoxide.

11. The method of claim 10 wherein the organic nucleophile is ethanol or dimethylformamide.

12. The method of claim 6 wherein the cross-linked aromatic polymer is a copolymer of a monovinylidene aromatic and a polyethylenically unsaturated monomer; the halogenating agent is bromine or bromine chloride; the organic nucleophile is an aliphatic alcohol, a monohydric glycol ether, a polyhydroxy-containing compound, a sulfonyl-containing organic, a phosphoramide, a carboxamide, a sulfoxide, a nitrile or a nitro-substituted hydrocarbon and the reaction is conducted in an organic liquid diluent, different from the organic nucleophile, which is less reactive towards the halogen atom than the aromatic polymer and which is capable of swelling the cross-linked aromatic polymer.

13. The method of claim 12 wherein the organic liquid diluent has a dielectric constant from about 1 to 11 and a solubility parameter from about 7 to 10 (cal/cc)$^{\frac{1}{2}}$.

14. The method of claim 12 wherein the organic liquid diluent is a halogenated hydrocarbon, a liquid alkane, benzene or a mixture thereof.

15. The method of claim 14 wherein the organic liquid diluent is a halogenated alkane having from 1 to about 4 carbon atoms, a halogenated aromatic, an alkane having from about 6 to about 10 carbon atoms or mixtures thereof.

16. The method of claim 15 wherein the organic liquid diluent is methylene chloride; 1,2-dichloroethane; 1,1-dichloroethane; chloroform; carbontetrachloride, heptane or 1,1,2-trichloro-1,2,2-trifluoroethane.

17. The method of claim 12 wherein the cross-linked aromatic polymer is swollen by a mixture of the organic liquid diluent and organic nucleophile and the halogenating agent added to the resulting mixture of the swollen polymer.

18. The method of claim 12 wherein the cross-linked aromatic polymer is swollen in a mixture of the organic liquid diluent, organic nucleophile and halogenating agent and the swollen polymer subsequently halogenated.

19. The method of claim 18 wherein the swollen polymer is separated from excess amounts of the mixture of the organic liquid diluent and organic nucleophile prior to halogenation.

20. The method of claim 17 or 19 wherein the halogenation is conducted at temperatures from about 0° to about 60° C. for a period of from about 30 minutes to about 8 hours.

21. The method of claim 12 wherein the cross-linked aromatic polymer is a copolymer of styrene and a polyvinylidene aromatic, the halogenating agent is bromine; the organic nucleophile is an alkyl alcohol having from 1 to about 10 carbon atoms, a dialkylcarboxamide or a dialkyl sulfoxide; the organic liquid diluent is methylene chloride, or 1,2-dichloroethane, 1,2,2-trichloroethane; the cross-linked aromatic polymer is swollen in a mixture of the organic liquid diluent, the organic nucleophile and the halogenating agent and the swollen polymer halogenated at temperatures from about 10° to about 40° C. for a period from about 60 minutes to 4 hours.

22. The method of claim 21 wherein the halogenating agent is employed in amounts from about 0.2 to about 2 moles per mole of mono- and polyvinylidene aromatic employed in preparing the cross-linked aromatic polymer; the organic nucleophile is ethanol or dimethylformamide and is employed in amounts from about 1 to about 5 volume parts per 100 volume parts of the organic liquid diluent, the organic liquid diluent is methylene chloride or 1,2-dichloroethane or a combination thereof and prior to contacting the aromatic polymer with the organic liquid diluent, the organic nucleophile and halogenating agent, the aromatic polymer is dispersed in an organic liquid resistant to halogenation and which does not significantly swell the polymer.

23. The method of claim 5 wherein the ion exchange resin is an anion exchange resin.

24. The method of claim 23 wherein the ion exchange resin is a weak base anion exchange resin prepared by contacting the halogenated polymer with ammonia or a primary or secondary amine.

25. The method of claim 24 wherein the primary or secondary amine is methylamine, ethylamine, butylamine, cyclohexylamine, dimethylamine or diethylamine.

26. The method of claim 23 wherein the ion exchange resin is a strong base anion exchange resin prepared by contacting the halogenated polymer with a tertiary amine.

27. The method of claim 26 wherein the tertiary amine is trimethylamine, triethylamine, tributylamine, dimethylisopropanolamine, dimethylethanolamine or ethylmethyl propylamine.

28. The method of claim 5 wherein the ion exchange resin is a chelating resin.

29. A method for preparing an ion exchange resin, said method comprising the steps of (a) contacting a cross-linked polymer of a monovinylidene aromatic with a halogenating agent in a bulk reaction diluent of an organic liquid compound having a dielectric constant from about 8 to 11, said contact being conducted at conditions sufficient to halogenate the polymer and using amounts of halogenating agent sufficient to increase the density of the polymer and (b) subsequently attaching ion-active exchange groups to the halogenated, cross-linked polymer.

30. The method of claim 29 wherein the halogenation of the cross-linked, aromatic polymer is conducted in the absence of a polar catalyst.

31. The method of claim 29 wherein the bulk reaction diluent further comprises an organic nucleophile having a free electron pair associated with a nonhalogen atom and a dielectric constant of at least 11.

32. The method of claim 29 wherein the reaction diluent is methylene chloride or 1,2-dichloroethane.

33. The method of claim 31 wherein the reaction diluent is methylene chloride or 1,2-dichloroethane.

* * * * *